United States Patent
Kastrinogiannis et al.

(10) Patent No.: US 9,395,890 B2
(45) Date of Patent: Jul. 19, 2016

(54) AUTOMATIC DISCOVERY OF SYSTEM BEHAVIOR

(71) Applicant: Microsoft Technology Licensing, LLC, Redmond, WA (US)

(72) Inventors: Kostas Kastrinogiannis, Charlottenlund (DK); Maciej Plaza, Copenhagen (DK); Marcin Zieminski, Copenhagen (DK)

(73) Assignee: Microsoft Technology Licensing, LLC, Redmond, WA (US)

( * ) Notice: Subject to any disclaimer, the term of this patent is extended or adjusted under 35 U.S.C. 154(b) by 252 days.

(21) Appl. No.: 13/894,445

(22) Filed: May 15, 2013

(65) Prior Publication Data

US 2014/0344732 A1 Nov. 20, 2014

(51) Int. Cl.
*G06F 3/0484* (2013.01)
*G06F 9/44* (2006.01)
*G06F 11/36* (2006.01)

(52) U.S. Cl.
CPC .............. *G06F 3/04842* (2013.01); *G06F 8/71* (2013.01); *G06F 11/3684* (2013.01)

(58) Field of Classification Search
CPC ........................................ G06F 11/36–11/3696
See application file for complete search history.

(56) References Cited

U.S. PATENT DOCUMENTS

| | | | |
|---|---|---|---|
| 8,185,877 B1 | 5/2012 | Colcord | |
| 2003/0037321 A1 | 2/2003 | Bowen | |
| 2007/0006043 A1* | 1/2007 | Pins | 714/38 |
| 2007/0168981 A1 | 7/2007 | Pacheco et al. | |
| 2008/0155515 A1* | 6/2008 | Stewart | G06F 11/3664 717/135 |
| 2009/0217309 A1* | 8/2009 | Grechanik et al. | 719/328 |
| 2009/0320002 A1* | 12/2009 | Peri-Glass | G06F 11/3688 717/131 |
| 2011/0107243 A1* | 5/2011 | Jain et al. | 715/762 |
| 2011/0310041 A1 | 12/2011 | Williams et al. | |
| 2012/0017210 A1* | 1/2012 | Huggins et al. | 718/1 |
| 2012/0210236 A1* | 8/2012 | Prasad | G06F 11/3604 715/738 |
| 2012/0254665 A1* | 10/2012 | Pasala et al. | 714/33 |
| 2012/0304160 A1 | 11/2012 | Soeder | |

FOREIGN PATENT DOCUMENTS

WO 2012/073197 A1 6/2012

OTHER PUBLICATIONS

Atif Memon, Adithya Nagarajan, and Qing Xie. (2005) Automating Regression Testing for Evolving GUI Software. Journal of Software Maintenance and Evolution: Research and Practice, 17(1), pp. 27-64.*

Tsung-Hsiang Chang, Tom Yeh, and Robert C. Miller. (2010) GUI testing using computer vision. CHI '10, pp. 1535-1544.*

"Crawljax." Getting Started. Crawljax, n.d. Web. Nov. 3, 2012. <http://web.archive.org/web/20121103191923/http://crawljax.com/documentation/getting-started>.*

(Continued)

*Primary Examiner* — Jennifer To
*Assistant Examiner* — Liang Li
(74) *Attorney, Agent, or Firm* — Thomas Marquis; Kate Drakos; Micky Minhas

(57) ABSTRACT

A first implementation of a software system is accessed and forms in the software system are selected. Controls on each selected form are interacted with in order to discover the behavior of the computer system. A representation of the behavior is stored for human observation or output to another system (such as a behavior verification system).

16 Claims, 19 Drawing Sheets

(56) References Cited

OTHER PUBLICATIONS

"Test Early and Often", Retrieved date <<http://msdn.microsoft.com/en-us/library/vstudio/ee330950.aspx>>, Retrieved Date: Mar. 5, 2013, pp. 23.

Gallagher, Leonard, "Conformance Testing of Object-Oriented Components Specified by State/Transition Classes", Retrieved at <<http://www.itl.nist.gov/div897/ctg/conformance/obj-comp-testing.pdf>>, May 19, 1999, pp. 13.

Tilley, et al. "A Survey of Formal Concept Analysis Support for Software Engineering Activities", Retrieved at <<http://citeseerx.ist.psu.edu/viewdoc/download?doi=10.1.1.57.6445&rep=rep1&type=pdf>>, In Formal Concept Analysis—Lecture Notes in Computer Science, vol. 3626, Retrieved Date: Mar. 5, 2013, pp. 21.

Rozinat, et al. "Conformance Checking of Processes Based on Monitoring Real Behavior", Retrieved at http://140.118.1.157/cht/Research%20Pro/Study%20Guide%20200708%20Process%20Mining/Conformance%20Checking%20of%20Processes%20Based%20on%20Monitoring%20Real%20Behavior..pdf, in Journal of Information Systems, vol. 33, Issue 1, Mar. 2008, pp. 44.

"International Search Report & Written Opinion for PCT Patent Application No. PCT/US2014/037941", Mailed Date: Jul. 29, 2014, Filed Date: May 14, 2014, 11 Pages.

Written Opinion for International Application No. PCT/US2014/037941, date of mailing: Mar. 19, 2015, date of filing: May 14, 2014, 6 pages.

"International Preliminary Report on Patentability Issued in PCT Application No. PCT/US2014/037941" Mailed Date: Jun. 17, 2015, 8 pages.

\* cited by examiner

FIG. 3C

Pallets (3-ccu) — 131

File | New | Delete | On-hand | Transactions | Pallet transport handling | Functions | Print | Read tag | Write Tag 141, 147

| Pallet ID | Pallet type |
|---|---|
| 00000017_114 | 42"X42" |
| 00000018_114 | 42"X42" |
| 00000019_114 | 42"X42" |
| 00000020_114 | 42"X42" |
| 00000021_114 | 42"X42" |
| 00000022_114 | 42"X42" |
| 00000023_114 | 42"X42" |
| 00000024_114 | 42"X42" |
| 00000025_114 | 42"X42" |
| 00000026_114 | 42"X42" |
| 00000027_114 | 42"X42" |
| 00000028_114 | 42"X42" |
| 00000029_114 | 42"X42" |
| 00000030_114 | 42"X42" |
| 00000031_114 | 42"X42" |
| 00000032_114 | 42"X42" |
| 00000033_114 | 42"X42" |
| 00000034_114 | 42"X42" |
| 00000035_114 | 42"X42" |
| 00000036_114 | 42"X42" |

133 — 153

ID of the RFID server.

Pallet ID: 00000017_114
Pallet type: 42"X42"
Tag status:

— 135

General
Warehouse: 22
Location: Out_01

— 137

RFID Parameters
Server ID:
Device name:

— 139

Sizes
Height: 6.00

| Pallets (3-ceu) | | | | | | | | |
|---|---|---|---|---|---|---|---|---|
| File ▼ | New | Delete | On-hand | Transactions | Pallet transport handling | Functions | Print | Read tag | Write Tag |

Pallet ID: 00000017_114
Pallet type: 42"X42"
Tag status:

General *
Warehouse:
Location:

Sizes
Height: 6.00 ← 137

RFID
Parameters
Server ID:
Device name: ← 139

← 135
← 145

| Pallet ID | Pallet type |
|---|---|
| 00000017_114 | 42"X42" | ← 143
| 00000018_114 | 42"X42" |
| 00000019_114 | 42"X42" |
| 00000020_114 | 42"X42" |
| 00000021_114 | 42"X42" |
| 00000022_114 | 42"X42" |
| 00000023_114 | 42"X42" |
| 00000024_114 | 42"X42" |
| 00000025_114 | 42"X42" |
| 00000026_114 | 42"X42" |
| 00000027_114 | 42"X42" |
| 00000028_114 | 42"X42" |
| 00000029_114 | 42"X42" |
| 00000030_114 | 42"X42" |
| 00000031_114 | 42"X42" |
| 00000032_114 | 42"X42" |
| 00000033_114 | 42"X42" |
| 00000034_114 | 42"X42" |
| 00000035_114 | 42"X42" |
| 00000036_114 | 42"X42" |

133

Description of the bearer

FIG. 3D

| Pallets (3-ccu) | | | | | | | |
|---|---|---|---|---|---|---|---|
| File ▼ | New | Delete | On-hand | Transactions | Pallet transport handling | Functions | Print | Read tag | Write Tag |

| Pallet ID | Pallet type |
|---|---|
| 00000017_114 | 42"X42" |
| 00000018_114 | 42"X42" |
| 00000019_114 | 42"X42" |
| 00000020_114 | 42"X42" |
| 00000021_114 | 42"X42" |
| 00000022_114 | 42"X42" |
| 00000023_114 | 42"X42" |
| 00000024_114 | 42"X42" |
| 00000025_114 | 42"X42" |
| 00000026_114 | 42"X42" |
| 00000027_114 | 42"X42" |
| 00000028_114 | 42"X42" |
| 00000029_114 | 42"X42" |
| 00000030_114 | 42"X42" |
| 00000031_114 | 42"X42" |
| 00000032_114 | 42"X42" |
| 00000033_114 | 42"X42" |
| 00000034_114 | 42"X42" |
| 00000035_114 | 42"X42" |
| 00000036_114 | 42"X42" |

Unique ID for the pallet (Serial Shipping Container Code)

Pallet ID: 00000629_114
Pallet type: 42"X42"
Tag status:

General
Warehouse: 22
Location: 02-04-03-1

Sizes
Height: 14.00

RFID Parameters
Server ID:
Device name:

FIG. 3F

New products (3) — 159

Create product

Product type: Item — 161
Product subtype: Product — 163

Identification

Product number: 000132_202 — 165
Product name: 000132_202
Search name: 000132_202

Catch weight

CW product: ☐ — 167

OK    Cancel

FIG. 3G

AUTOMATIC DISCOVERY OF SYSTEM BEHAVIOR

BACKGROUND

There are a wide variety of different types of computer systems that are currently in use. It is common to change a deployment of a computer system from one implementation to another implementation. In performing such a reimplementation of a computer system, it can be desired that the behavior of the second implementation be the same as the behavior of the first implementation. In order to ensure that the behavior of the second implementation preserves the behavior found in the first implementation, the behavior of the second system can be verified to ensure that it behaves in the same manner as the first implementation.

Currently, this type of verification is largely performed manually. That is, behavior of the first implementation is manually explored. Then, a user performs manual verification that the same behavior exists in the second implementation.

This type of verification encounters a number of different problems. For instance, verification is often not performed until the second implementation has been fully implemented. At that point, a verification is manually performed by having a user observe the performance of the first implementation and manually verify that it exists in the second implementation. Performing verification after the second implementation has been substantially completed, reduces the likelihood that errors or inconsistencies will be identified early on in the reimplementation process, where they can be more easily remedied. In addition, many current computer systems are so large that manual verification can be very difficult, time consuming, cumbersome, and error prone.

By way of example, some current computer systems are business systems, such as enterprise resource planning (ERP) systems, customer resource management (CRM) systems, line-of-business (LOB) systems, etc. These types of business systems often have many thousands of different forms, each with many different controls. However, it is not uncommon for even these large business systems to be migrated, for instance, from an on-premise implementation to a cloud-based implementation, or vise versa. This type of reimplementation can be very difficult, because it can be very time consuming to ensure that the reimplementation is a behavior-preserving reimplementation. The behavior verification task is simply too burdensome.

The discussion above is merely provided for general background information and is not intended to be used as an aid in determining the scope of the claimed subject matter.

SUMMARY

A first implementation of a software system is accessed and forms in the software system are selected. Controls on each selected form are interacted with in order to discover the behavior of the computer system. A representation of the behavior is stored for human observation or output to another system (such as a behavior verification system).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 3C-3H are illustrative user interface displays.

DETAILED DESCRIPTION

Figure 1:
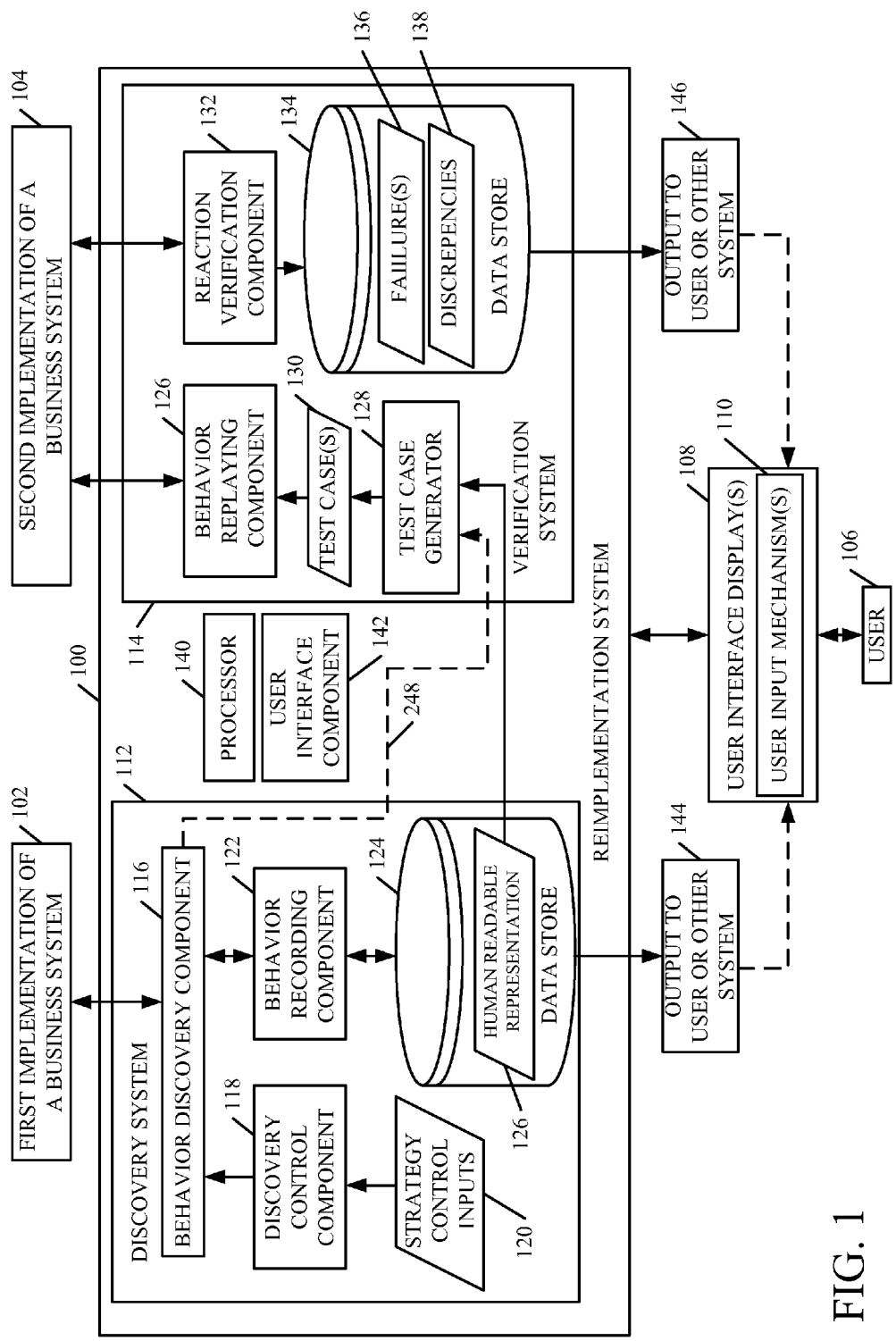
FIG. 1 is a block diagram of one embodiment of a reimplementation system.

FIG. 1 is a block diagram of one embodiment of reimplementation system 100. FIG. 1 shows reimplementation system 100 having access to a first implementation 102 of a business system and a second implementation 104 of the business system. FIG. 1 also shows that user 106 can illustratively access reimplementation system 100 through user interface displays 108 that, themselves, include user input mechanisms 110. In one embodiment, user 106 can interact with user input mechanisms 110 on user interface displays 108 in order to control and manipulate reimplementation system 100.

FIG. 1 also shows that reimplementation system 100 illustratively includes discovery system 112 and verification system 114. Discovery system 112 includes behavior discovery component 116, discovery control component 118 that receives strategy control inputs 120, behavior recording component 122 and data store 124 that stores a human readable representation 126 of the behavior of first implementation 102 of the business system, as discovered by behavior discovery component 116.

Verification system 114 includes behavior replaying component 126, test case generator 128 that generates test cases 130, reaction verification component 132 and data store 134 that stores failures 136 and behavior discrepancies 138. FIG. 1 also shows that reimplementation system 100 illustratively includes processor 140 and user interface component 142 that generates user interface displays 108. FIG. 1 further shows that, instead of simply storing data in data stores 124 and 134, the data can be output for observation by user 106 or to another system. The output of data from discovery system 112 is indicated by block 144, and the output of data from verification system 114 is indicated by block 146.

Prior to discussing the overall operation of reimplementation system 100, a number of preliminary items will first be discussed. Processor 140 is illustratively a computer processor with associated memory and timing circuitry (not separately shown). It is illustratively a functional component of reimplementation system 100 and is activated by and facilitates the functionality of, other systems, components, or items of reimplementation system 100.

Data store 124 is shown as part of discovery system 112, and data store 134 is shown as part of verification system 114. It will be noted, however, that those data stores need not be part of systems 112 and 114, respectively, but could be separate or remote therefrom and accessible by those systems. In addition, while a single data store is shown in system 112 and system 114, multiple data stores can be used as well. The multiple data stores can all be local to system 100, or remote therefrom, or some can be local while others can be remote.

Figure 2:
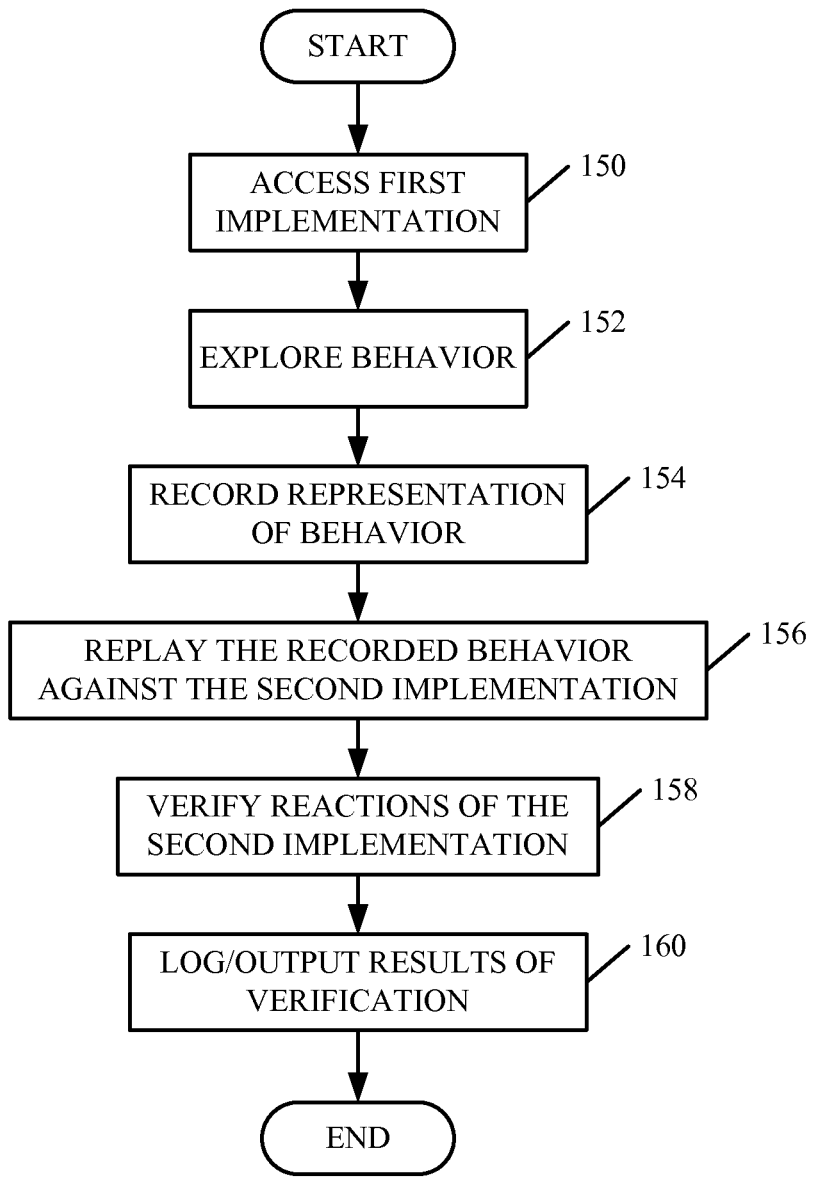
FIG. 2 is a flow diagram illustrating one embodiment of the overall operation of the system shown in FIG. 1.

FIG. 2 is a flow diagram illustrating one embodiment of the overall operation of reimplementation system 100 shown in FIG. 1. Discovery system 112 first accesses the first implementation 102 of the business system in order to discover its behavior. Accessing first implementation 102 is indicated by block 150 in FIG. 2. Behavior discovery component 116 then discovers the behavior of the first implementation 102. This is indicated by block 152. Discovering the behavior of implementation 102 is discussed in greater detail below with respect to FIGS. 3A and 3B.

Once the behavior has been explored and discovered, behavior recording component 122 illustratively records a representation of the behavior of the first implementation 102. This is indicated by block 154. One exemplary representation is a human readable representation 126 that is stored in data store 124.

Where the representation of the behavior of first implementation 102 is to be used to verify the reimplementation of that system (that is, to verify the behavior of a second implementation 104 of the business system), generator 128 accesses the representation 126 and generates test cases 130 which are replayed against the second implementation 104 by behavior replaying component 126. This is indicated by block 156 in FIG. 2.

Reaction verification component 132 observes the reactions of second implementation 104, when the test cases 130 are replayed against it, to verify that the reaction is the same as that of first implementation 102. Verifying the reactions of the second implementation 104 is indicated by block 158 in FIG. 2.

Results of the verification can then be logged (such as in the form of failures 136, or behavior discrepancies 138) in data store 134, or they can be output for use by another system, for human observation, etc. This is indicated by block 160 in FIG. 2.

Figure 3A:
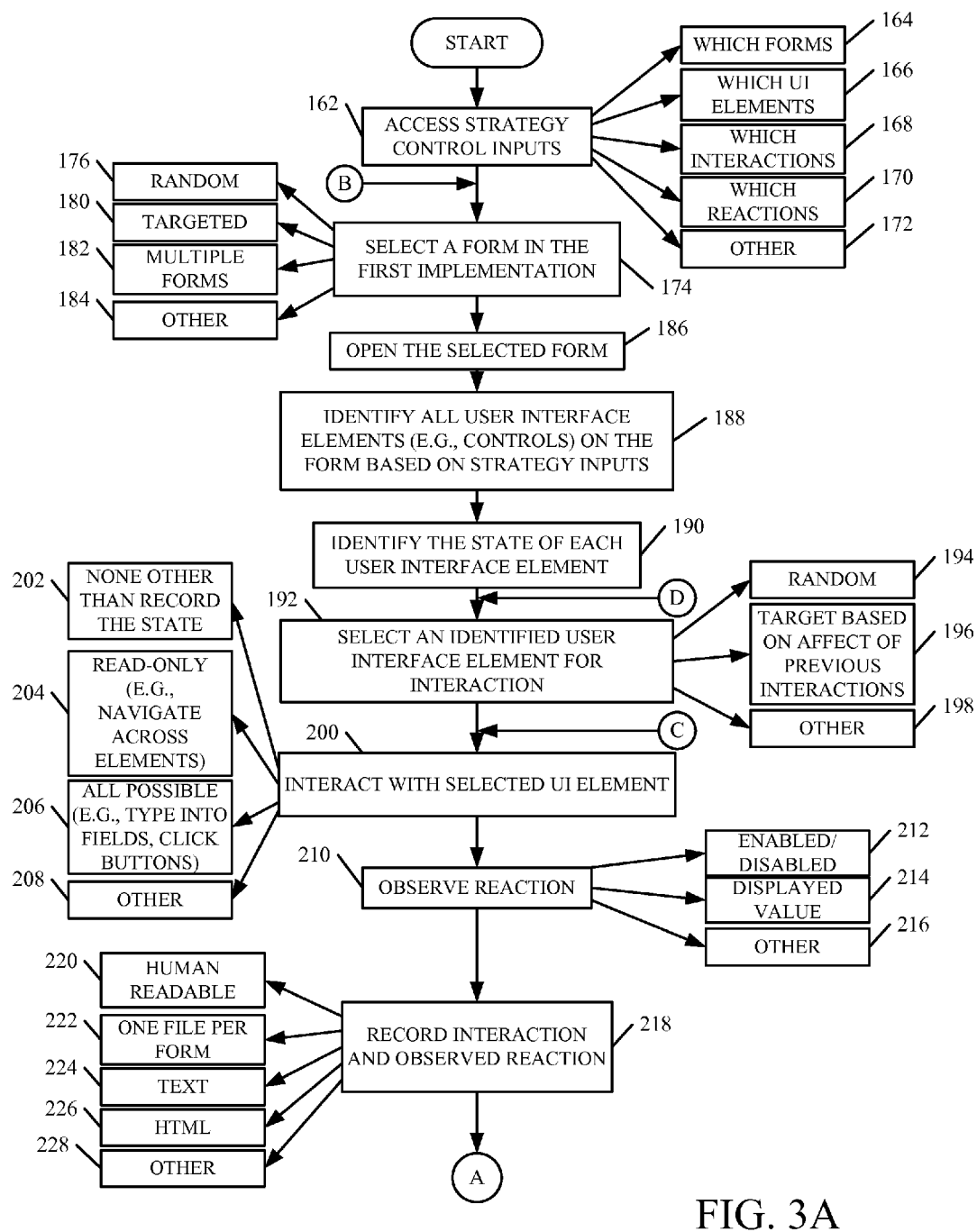
FIGS. 3A and 3B show a flow diagram illustrating one embodiment of the operation of the discovery system shown in FIG. 1 in discovering system behavior.
Figure 3B:
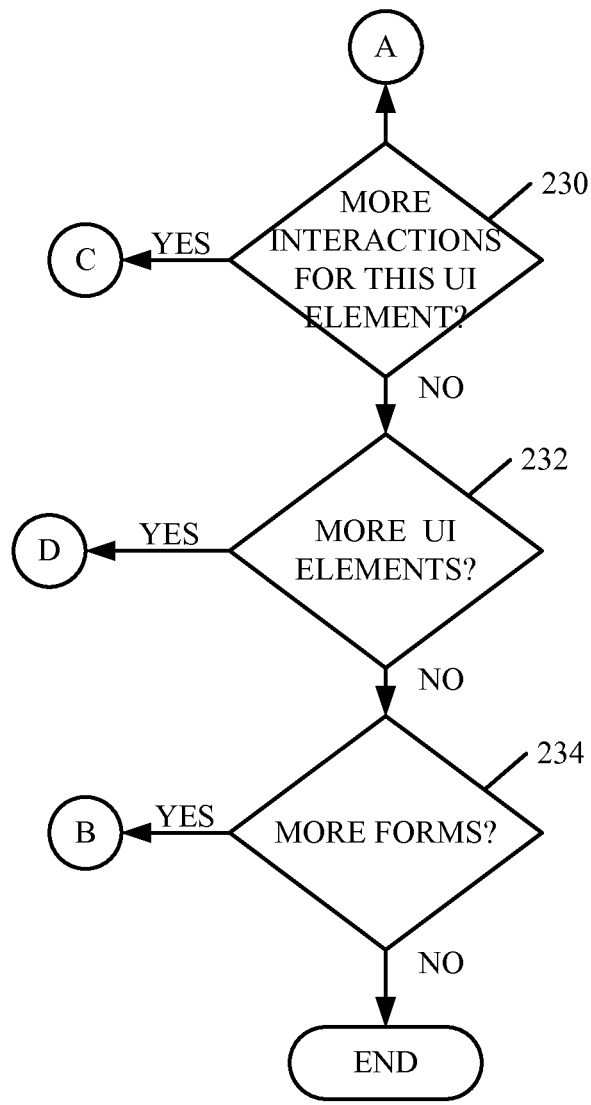

FIGS. 3A and 3B show a flow diagram illustrating the operation of discovery system 112 in automatically discovering the behavior of first implementation 102, in more detail. In accordance with one embodiment, discovery control component 118 can control the discovery strategy employed by behavior discovery component 116 in discovering the behavior of first implementation 102. The discovery strategy may change for a wide variety of different reasons. For instance, in one embodiment, the first implementation of the business system 102 is a very large business application. It may have thousands of forms with many thousands of controls. Therefore, it may be reimplemented in the second implementation 104 in stages. However, it may be helpful to verify that the behavior of second implementation 104 is the same as that of first implementation 102, before the entire migration or reimplementation is complete. Thus, user 106 can provide strategy control inputs 120 to discovery control component 118 that controls the discovery strategy employed by behavior discovery component 116.

As a specific example, assume that implementation 102 is being migrated to second implementation 104 and a substantial amount of work has been performed in migrating the business system. However, assume that combo boxes on the user interfaces are not yet functional in second implementation 104. In that case, instead of waiting for all user interface elements to be functional in order to verify the behavior of second implementation 104, user 106 can simply provide strategy control inputs 120 that indicate to discovery control component 118 that the behavior of the combo boxes is not yet to be verified. In that case, discovery control component 118 can control behavior discovery component 116 so that it does not waste any computational resources in attempting to discover the behavior of combo boxes on the forms in first implementation 102. By form, it is meant a display generated by the implementation such as a window or a web page. Similarly, of course, some forms may not yet be migrated from first implementation 102 to second implementation 104 and those forms can be omitted from the discovery process, at this point, as well. Also, some interactions (such as some click behavior or typing text into a text box, etc.) may not yet be enabled in second implementation 104, or certain reactions (such as activating a button in response to clicking another button, etc.) may not yet be functional in second implementation 104. All of these things can be considered in controlling the discovery strategy of behavior discovery component 116 in discovering the behavior of first implementation 102.

Therefore, as shown in FIG. 1, discovery component 118 first accesses strategy control inputs 120 to determine how to control the discovery strategy employed by behavior discovery component 116. This is indicated by block 162 in FIG. 3A. Of course, strategy control inputs 120 can identify which forms 164 are to be discovered, which user interface elements 166, which interactions 168, which reactions 170, or a wide variety of other strategy control inputs 172 can be provided to discovery control component 118 to control the strategy of discovery component 116.

Behavior discovery component 116 then selects a form in first implementation 102. This is indicated by block 174. Form selection can be performed in a wide variety of different ways as well. For instance, component 116 can simply select a form at random as indicated by block 176, or given forms can be targeted as indicated by block 180. For instance, the most frequently used forms can be targeted first, or forms can be targeted in the order in which a user of first implementation 102 uses them, or they can be targeted in other ways. In addition, multiple forms 182 can be accessed and behavior discovery component 116 can navigate across multiple forms to discover the behavior of multiple forms using a single pass. However, the present description will proceed with respect to discovering the behavior of a single form at a time, although this is described by way of example only. Of course, behavior discovery component 116 can select a form in first implementation 102 in other ways was well, and this is indicated by block 184.

Behavior discovery component 116 then opens the selected form. This is indicated by block 186.

Behavior discovery component 116 then identifies all user interface elements (such as controls) on the selected form, based on the strategy control inputs. This is indicated by block 188. For instance, behavior discovery component 116 will identify all of the controls on a form, where it is not restricted by the strategy control inputs 120. However, where some controls are not yet to be discovered, then behavior discovery component 116 does not look for those types of controls on the selected form.

Once the user interface elements (or controls) on the selected form have been identified, then the state of each of those user interface elements is identified. This is indicated by block 190.

Behavior discovery component 116 then selects one of the user interface elements on the selected form, for interaction. This is indicated by block 192. The user interface elements can be selected for interaction in a wide variety of different ways as well. For instance, they can be selected at random, as indicated by block 194. They can also be targeted as indicated by block 196. By way of example, if behavior discovery component 116 had previously interacted with a user interface element (such as by clicking on a button), and that resulted in a second button becoming active on the form, then behavior discovery component 116 can select that particular, newly activated, button (or user interface element) for its next interaction step. This tends to mimic what an actual person would do when interacting with that form. Of course, behavior discovery component 116 can select a given user interface element on the selected form in other ways as well and this is indicated by block 198.

Behavior discovery component 116 then interacts with the selected user interface element on the form. This is indicated by block 200 in FIG. 3A. The particular interaction performed by behavior discovery component 116 on the user interface element can be any possible interaction, or it can be chosen from a predefined subset of interactions. For instance, in one embodiment, behavior discovery component 116 does not perform an affirmative interaction step on the selected user interface element but merely records the state (such as active or inactive) of that user interface element. This is indicated by block 202. It can also perform a read only interaction 204, which may be simply navigating across different elements. It can also perform any or all possible types of interaction, such as typing into text fields, clicking buttons, etc. This is indicated by block 206. Behavior discovery component 116 can, of course, perform other interactions 208 as well.

Once behavior discovery component 116 performs the interaction on the selected user interface element of the selected form, it observes the reaction of that form as indicated by block 210. For instance, the form may enable or disable various user interface elements. This is indicated by block 212. It may change the displayed values in the user interface elements, as indicated by block 214, or it can react in other ways as well, and this is indicated by block 216. Again, behavior discovery component 116 can illustratively look for any type of reaction, or look for reactions that are part of a predefined set of reactions, or it can look in other ways as well.

Behavior recording component 122 then records the behavior (such as the interaction and observed reaction) in data store 124. Recording the interaction and observed reaction is indicated by block 218 in FIG. 3A. The interaction and observed reaction can be recorded in a wide variety of different ways. For instance, it can be recorded in human readable form 220. It can be recorded in a file, with one file per form, as indicated by block 222. It can be recorded in text format 224, in HTML 226, or in other ways 228. In one embodiment, it can also be recorded with the interaction and the observed reaction on a single line in a text file, or in other formats or according to other schemas.

Once the interaction and observed reaction have been recorded, then behavior discovery component 116 determines whether there are more user interactions for the selected user interface element. This is indicated by block 230. If so, processing returns to block 200 where behavior discovery component 116 performs another interaction on this particular user interface element and observes and records the behavior. If not, however, then behavior discovery component 116 determines whether there are more user interface elements on the selected form, which are to be interacted with. This is indicated by block 232. If so, processing returns to block 192 where another identified user interface element is selected for interaction. If there are no additional user interface elements to interact with on this form, then behavior discovery component 116 determines whether there are more forms to subject to the discovery process. This is indicated by block 234. If so, processing returns to block 174 where another form is selected from the first implementation 102 of the business system. However, if there are no forms left, then processing is complete as shown in FIG. 3B.

FIGS. 3C-3H show illustrative user interface displays that exhibit forms that are automatically interacted with, and that show a reaction. FIG. 3C, for instance, shows a user interface display 131 from a business system on which a grid 133 lists lines of pallets. Each pallet has a pallet identifier and a pallet type. Pallet identifying portion 135 has fields that can be edited to include a pallet ID, a pallet type, and a tag status. A general portion 137 also includes fields that can be used to identify a warehouse, a location, and a size for a given pallet. An RFID portion 139 has fields that can be used to identify the RFID information for the pallet. If the user were to actuate new button 141, on the form shown as user interface display 131, the business system reacts by generating a modified form.

FIG. 3D shows one embodiment of this reaction. It can be seen in FIG. 3D that, on user interface display 145, an additional row 143 has been added to grid 133. Further, the fields in section 135 have been made available for editing. A number of default values have been inserted into some of the fields. Thus, this reaction is recorded when the interaction with the form shown in FIG. 3C is to actuate the new button 141.

Figure 3E:
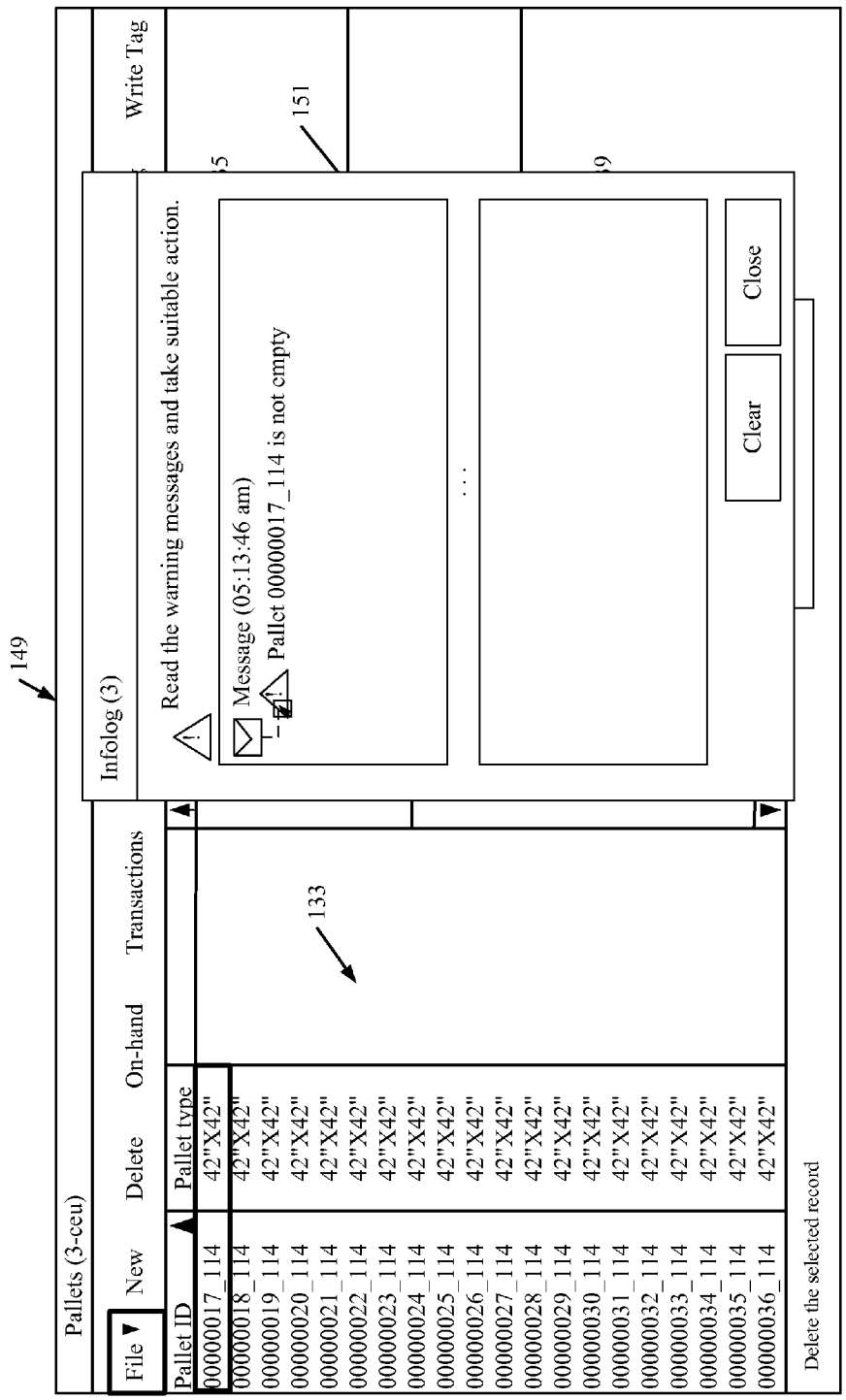
Figure 3H:
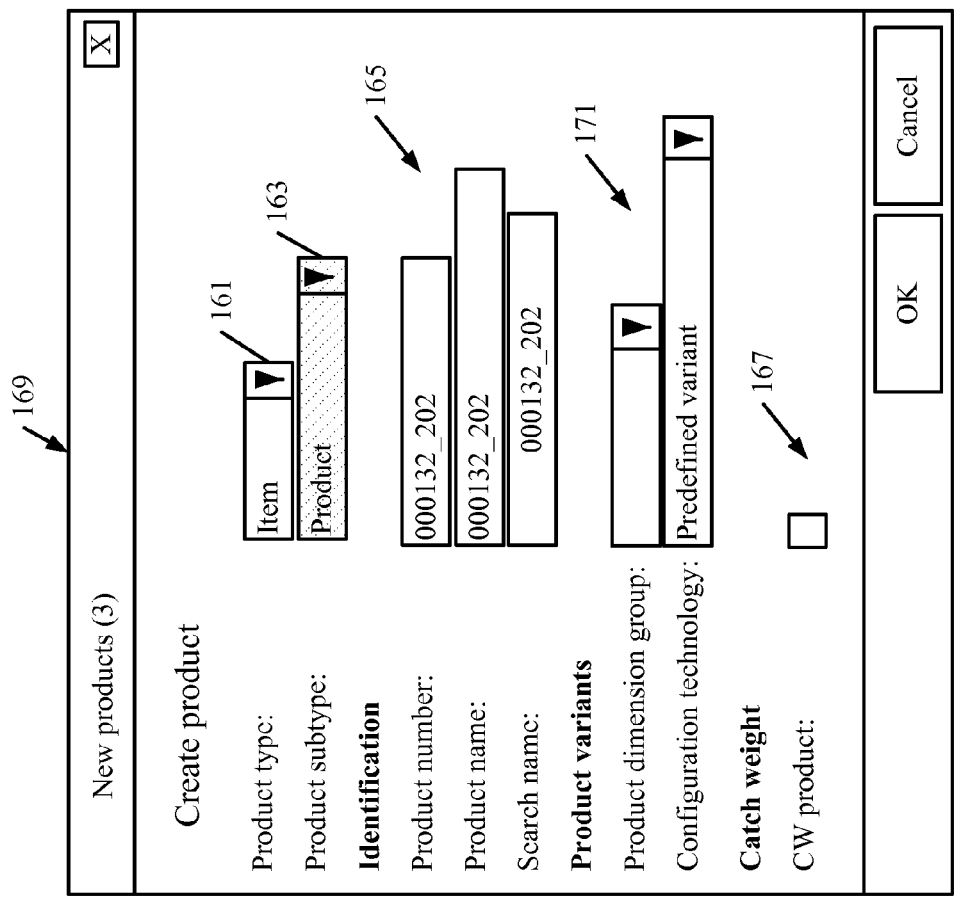

Referring again to FIG. 3C, if the user actuates delete button 147, assuming that the pallet that the user wishes to delete is still in use, then a warning message is displayed, such as that shown on the user interface display 149 of FIG. 3E. Warning message 151 indicates that the user is attempting to delete a pallet that is still in use. Thus, this reaction would also be observed and recorded.

Referring again to FIG. 3C, assume that the user selected another row 153 in grid 133. The business system illustratively reacts by generating the user interface display 155 shown in FIG. 3F. It can be seen that row 153 in grid 133 has now been selected, and a number of the controls in display portions 135 and 137 have changed values. Specifically, the values have been changed to match the newly selected pallet identified in row 153 of grid 133.

FIG. 3G shows another user interface display 159. It can be seen that user interface display 159 has a product type field 161, a product subtype field 163, a set of identification fields 165 and a catch weight portion 167. If the user enters a new value into the product subtype field 163, then the business system reacts by generating the user interface display 169 shown in FIG. 3H. It can be seen that a new value has been entered in field 163, and additional product variants fields 171 have been made available. This reaction is also observed and recorded. Of course, FIGS. 3C-3H are exemplary only.

Figure 4:
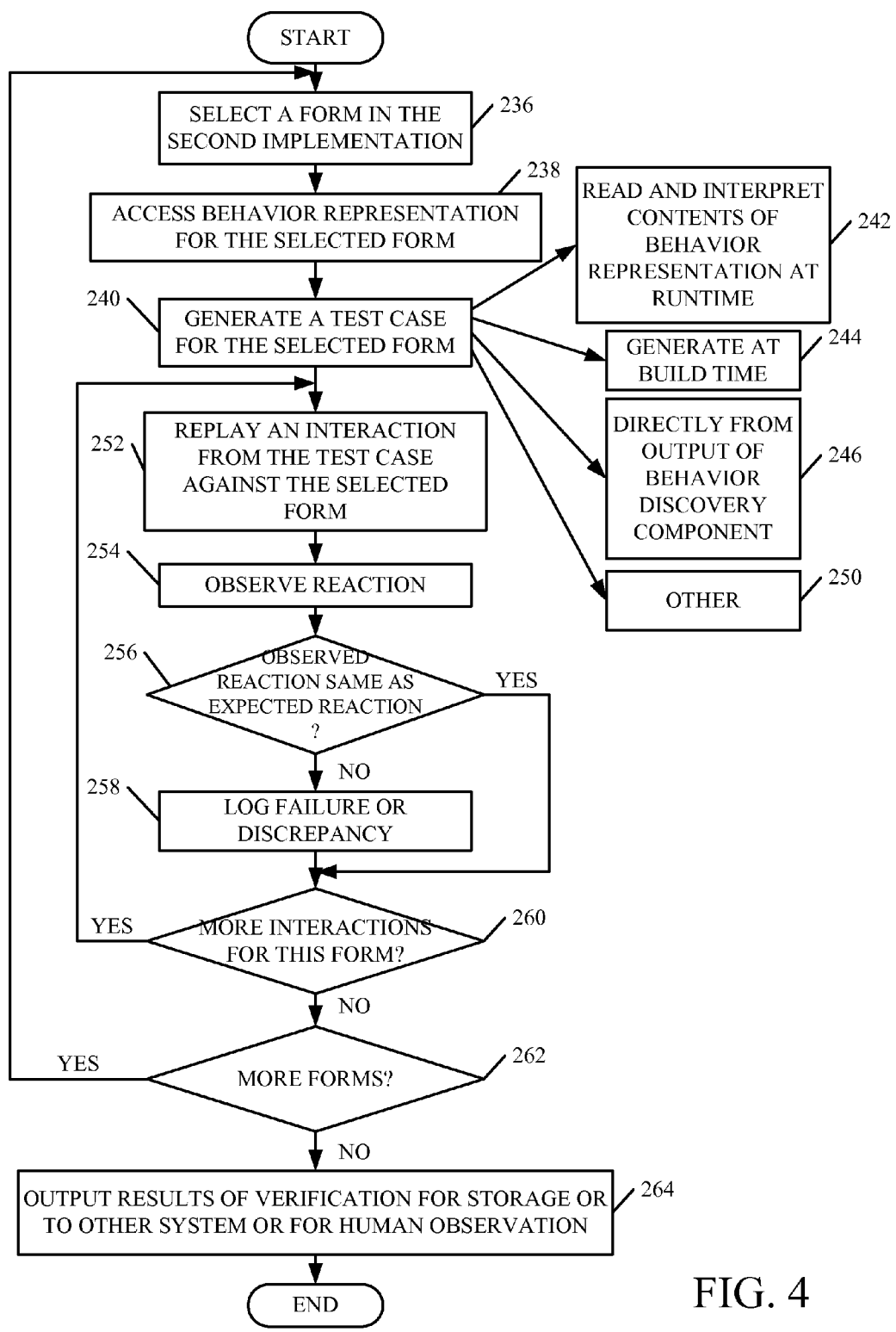
FIG. 4 is a flow diagram illustrating one embodiment of the operation of the verification system shown in FIG. 1 in verifying system behavior.

FIG. 4 is a flow diagram illustrating one embodiment of the operation of verification system 114 in verifying that the behavior of second implementation 104 of the business system corresponds to the behavior of the first implementation 102 of the business system. In one embodiment, behavior replaying component 126 first accesses or selects a form in the second implementation 104 of the business system. This is indicated by block 236 in FIG. 4.

Test case generator 128 then accesses the behavior representation for the selected form in data store 124. Of course, this information can be provided to test case generator 128, or test case generator 128 can access it in data store 124, or test case generator 128 can obtain this information in other ways (such as directly from behavior discovery component 116, or otherwise). Obtaining the information is indicated by block 238 in FIG. 4. Test case generator 128 then generates a test case for the selected form. This is indicated by block 240 in FIG. 4. Test case generator 128 can do this in a wide variety of different ways. For instance, it can read and interpret the contents of the behavior representation 126 at runtime. This is indicated by block 242. It can also generate test case 130 at build time, as indicated by block 244. In that embodiment, it illustratively translates the recorded file (representation 126) into actual test code directly expressing the operations. Of course, the test cases 130 can be generated immediately from the output of behavior discovery component 116 as indicated by block 246 in FIG. 4 and the dashed arrow 248 in FIG. 1. Test case generator 128 can generate test cases 130 in other ways as well and this is indicated by block 250 in FIG. 4.

Behavior replaying component 126 then replays an interaction with a user interface element on the selected form, based on the test case 130. This is indicated by block 252 in FIG. 4.

Reaction verification component 132 then observes the reaction of the selected form and verifies that its reaction is the same or equivalent as that recorded from first implementation 102. For instance, in the second implementation, it may be that warning messages each get displayed in a separate form, while in the first implementation, each form may have a separate notification area. In that example, as long as the warning messages get displayed in the proper place the reactions are equivalent. Observing the reaction is indicated by block 254 and determining whether it is the same or equivalent as the expected reaction is indicated by block 256. If the two reactions are not the same or equivalent, then a failure or behavioral discrepancy has been identified for the selected user interface element on the selected form. It is logged as indicated by block 258 in FIG. 4.

However, if, at block 256, the observed reaction is the same as the expected reaction, then behavior replaying component 126 moves on to determine whether there are any more interactions for the selected form in test cases 130. This is indicated by block 260 in FIG. 4. If so, processing reverts to block 252 where another interaction from the test case 130 is replayed against second implementation 104 of the business system. If not, however, then behavior replaying component 126 determines whether there are more forms for which to verify behavior. This is indicated by block 262. If so, processing reverts back to block 236 where the next form in second implementation 104 of the business system is selected for behavioral verification. If not, then reaction verification component 132 illustratively logs the failures 136 or discrepancies 138, or both, as well as the successful interactions, in data store 134. They can also illustratively be output as indicated by block 146 in FIG. 1 for user observation or for processing by other systems. Outputting the results of the verification for storage, human observation or for other systems is indicated by block 264 in FIG. 4.

Figure 5:
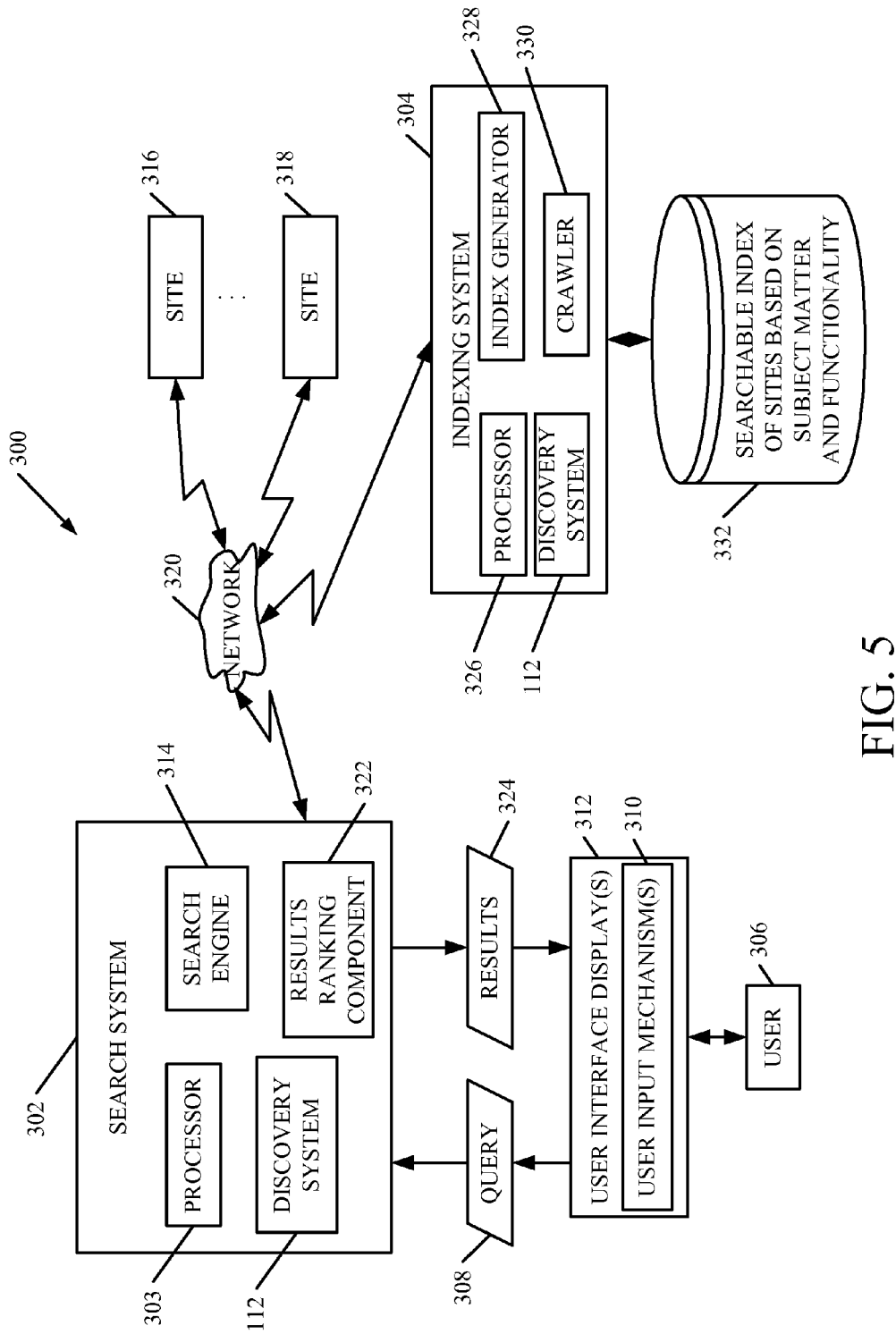
FIG. 5 is a block diagram of a discovery system shown in FIG. 1 in a search system and an indexing system.

FIG. 5 shows one embodiment of an architecture 300 in which portions of system 100 are deployed, but they are not necessarily used for verification of a reimplementation of a business system. Instead, FIG. 5 shows that discovery system 112 can be deployed in a search system 302 or an indexing system 304, or both. Search system 302 illustratively includes processor 303, discovery system 112, search engine 314 and results ranking component 322. Processor 303 is illustratively a computer processor with associated memory and timing circuitry (not separately shown). It can be a functional part of search system 302 and activated by, and facilitate the functionality of, other items in search system 302.

When deployed in search system 302, a user 306 illustratively provides a user input query 308 through a suitable user input mechanism 310 (such as a search box) on a user interface display 312. Query 308 is illustratively provided to search engine 314 which uses it to search various sites 316-318 for corresponding subject matter, over network 320. Search engine 314 illustratively identifies search results based on the user input query 308.

Discovery system 112 then illustratively discovers the behavior of the sites from which the search results were obtained. The behavior of those sites can be used by results ranking component 322 in outputting the actual results 324 that are returned to user 306. This can be useful in a wide variety of different ways. For instance, it may be that user 306 is looking for sites that have interactive maps or search capability within the site itself. By discovering the behavior of the sites from which the search results have been identified by search engine 314 (based on subject matter), ranking component 322 can more adequately rank the search results according to the needs of user 306, by including the functionality of the cite in the ranking determination. Of course, the behavior information can be used by search system 302 in a wide variety of other ways as well.

In another embodiment, discovery system 112 is deployed in an indexing system 304 which, itself, includes processor 326, index generator 328 and crawler 330. Indexing system 304 illustratively generates a searchable index of sites 316-318 based on the subject matter and functionality found in those sites and stores it in a data store as index 332. Processor 326 is illustratively a computer processor with associated memory and timing circuitry (not separately shown) and is a functional part of system 304. Processor 326 is illustratively activated by, and facilitates the functionality of, other systems or items in indexing system 304.

In order to generate index 332, indexing system 304 illustratively uses crawler 330 to crawl various sites 316-318 over network 320 to identify the subject matter of those sites. Discovery system 112 then discovers the functionality of the various forms or pages on those sites and provides that information to index generator 328 as well. Index generator 328 then indexes the sites 316-318 based not only on the subject matter identified by crawler 330, but based on the site functionality as indicated by discovery system 112. The searchable index 332 can be used by search engine 314 of search system 302, or it can be used directly by user 306, or accessed over network 320 by other systems as well. Those described in FIG. 5 are described for the sake of example only.

Figure 6:
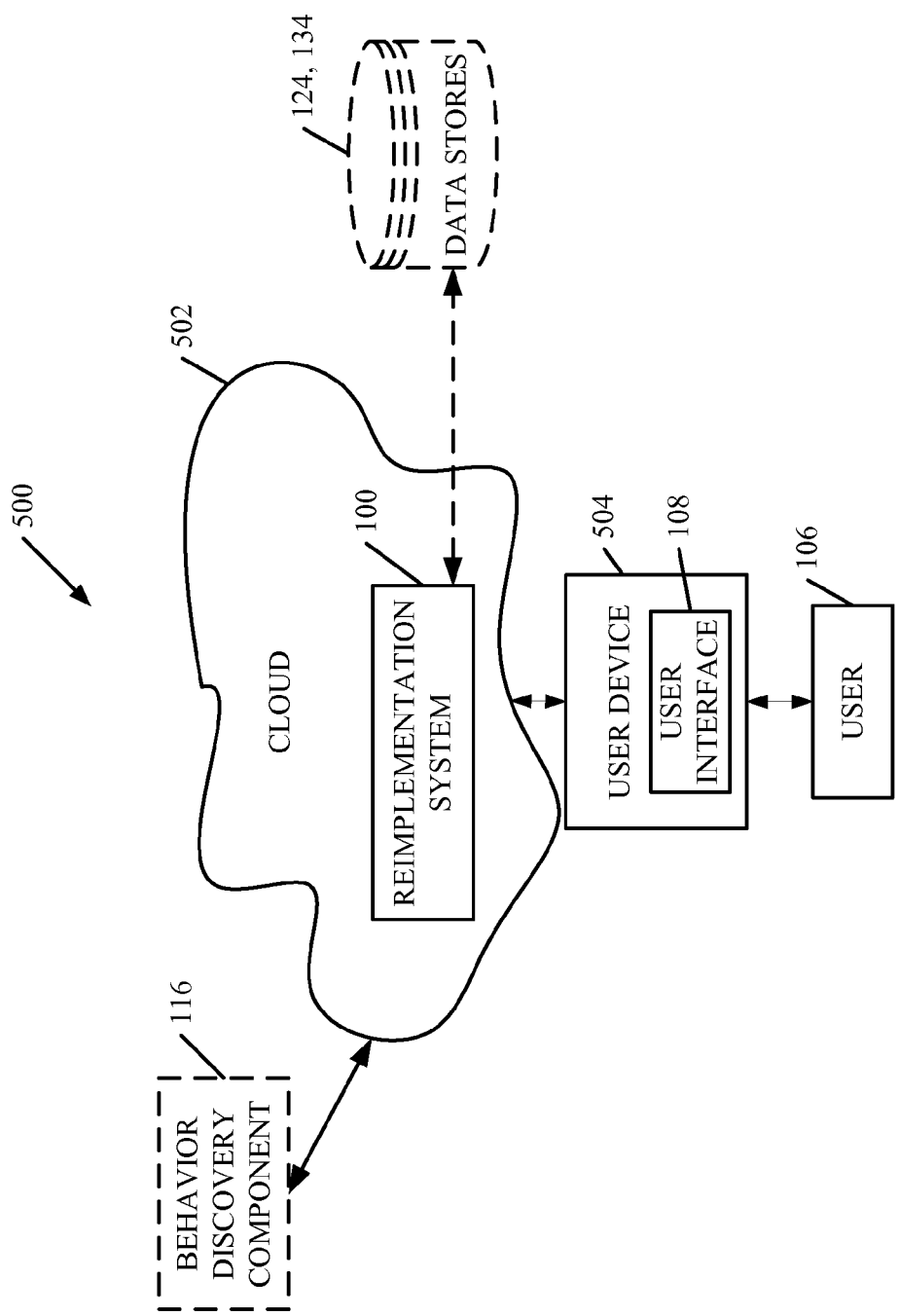
FIG. 6 is a block diagram of the reimplementation system shown in FIG. 1 in various architectures.

FIG. 6 is a block diagram of reimplementation system 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of system 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 6, some items are similar to those shown in FIG. 1 and they are similarly numbered. FIG. 6 specifically shows that reimplementation system 100 is located in cloud 502 (which can be public, private, or a combination where portions are public while others are private). Therefore, user 106 uses a user device 504 to access those systems through cloud 502.

FIG. 6 also depicts another embodiment of a cloud architecture. FIG. 6 shows that it is also contemplated that some elements of system 100 are disposed in cloud 502 while others are not. By way of example, data stores 124, 134 can be disposed outside of cloud 502, and accessed through cloud 502. In another embodiment, behavior discovery component 116 is also outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that system 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
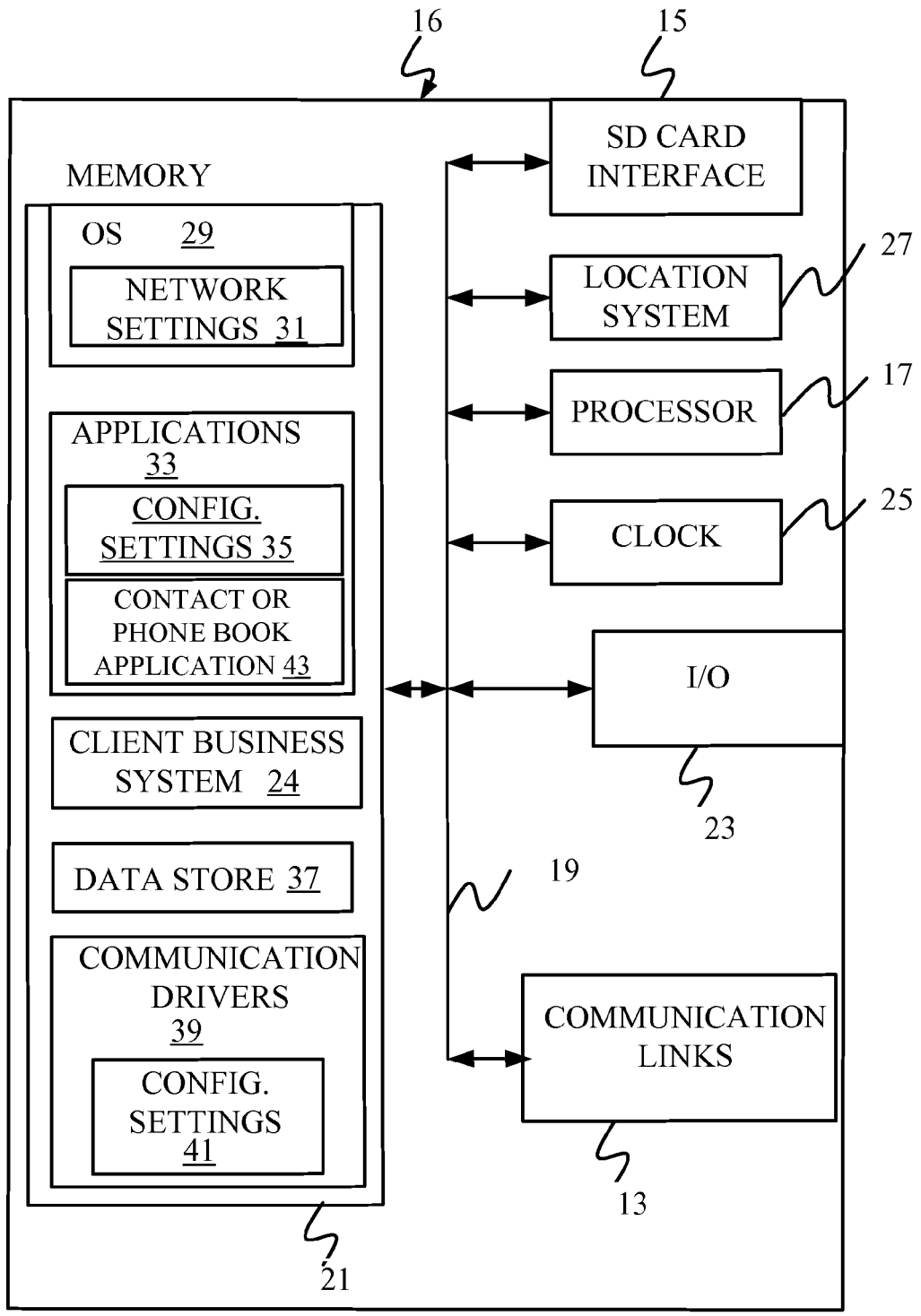
FIGS. 7-11 show different embodiments of mobile devices.

FIG. 7 is a simplified block diagram of one illustrative embodiment of a handheld or mobile computing device that can be used as a user's or client's hand held device 16, in which the present system (or parts of it) can be deployed. FIGS. 8-11 are examples of handheld or mobile devices.

FIG. 7 provides a general block diagram of the components of a client device 16 that can run components of system 100 or that interacts with system 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xRTT, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processor 140 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Application 33 or the items in data store 37, for example, can reside in memory 21. Similarly, device 16 can have a client business system 24 which can run various business applications or embody parts or all of system 100 or be first implementation 102 or second implementation 104. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

Figure 8:
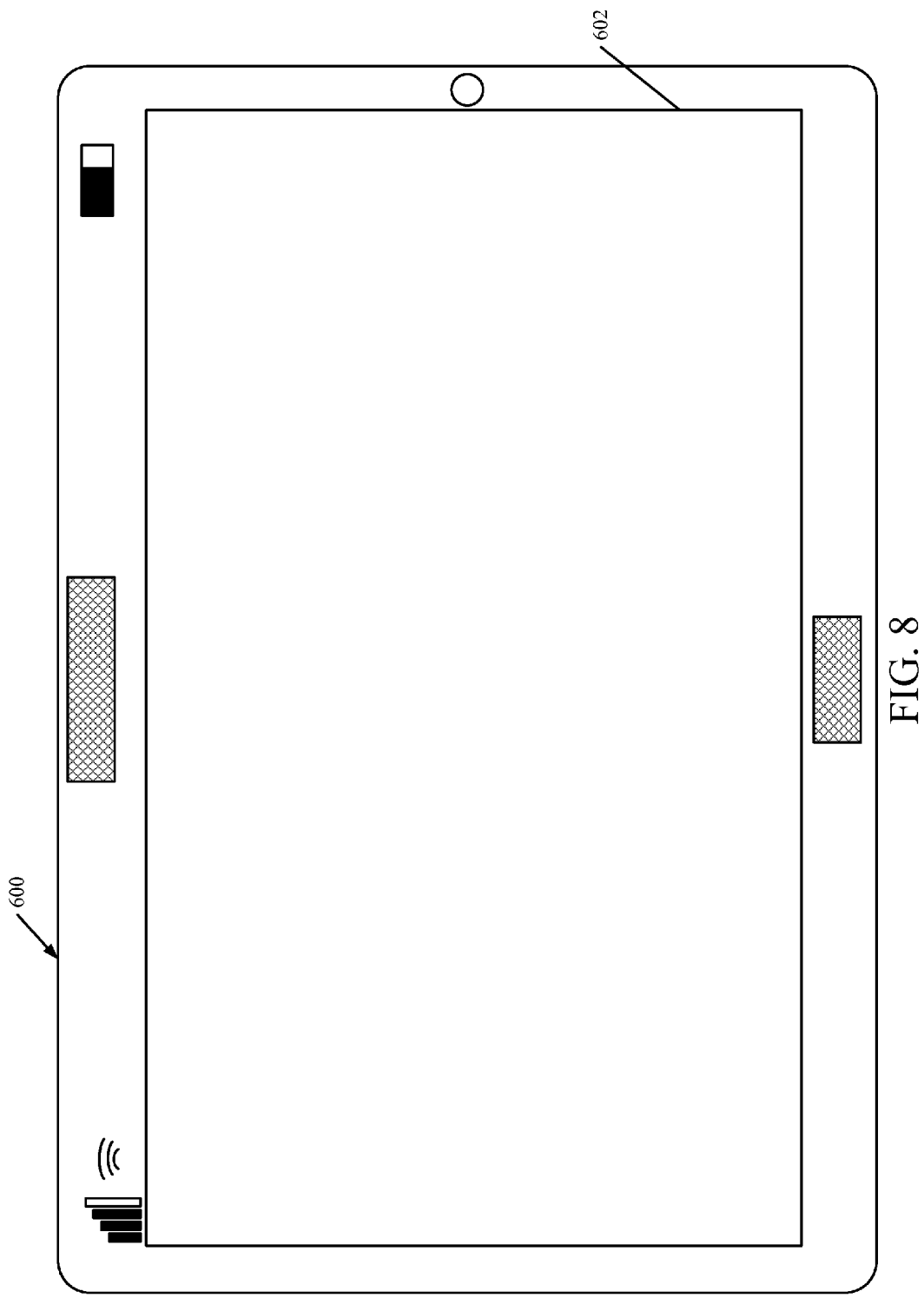

FIG. 8 shows one embodiment in which device 16 is a tablet computer 600. In FIG. 6, computer 600 is shown with display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 9:
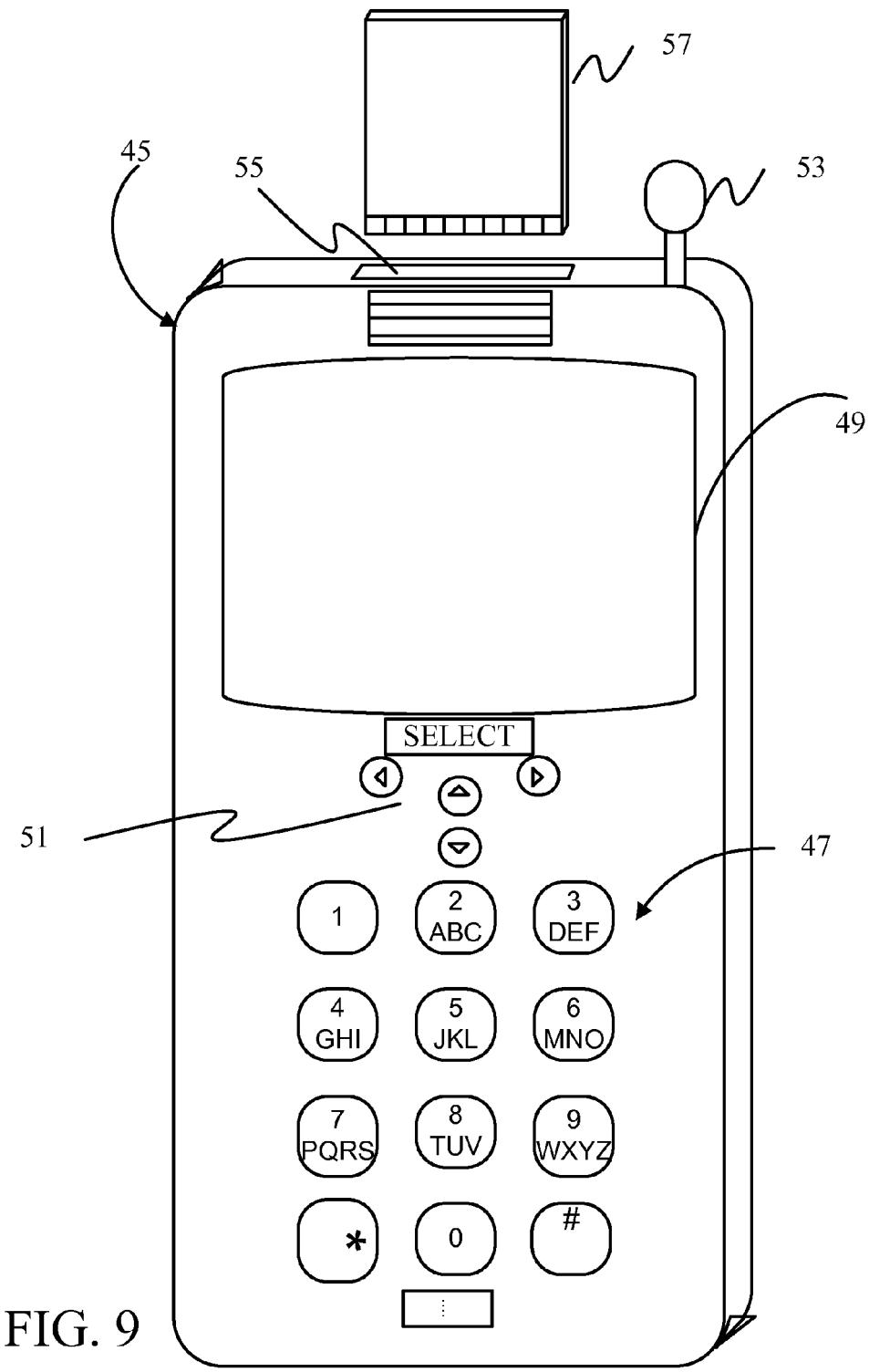
Figure 10:
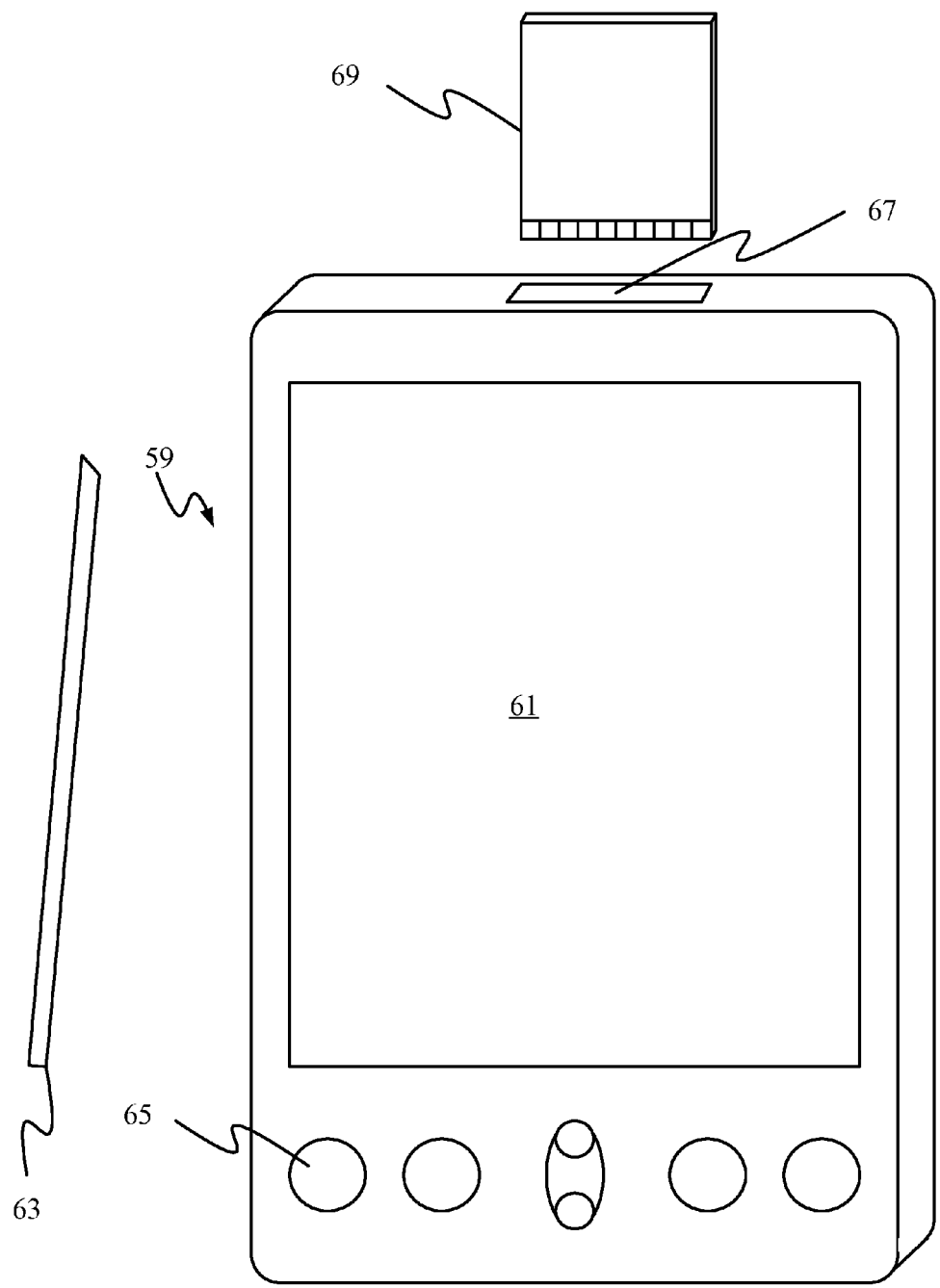

FIGS. 9 and 10 provide additional examples of devices 16 that can be used, although others can be used as well. In FIG. 9, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1xRTT, and Short Message Service (SMS) signals. In some embodiments, phone 45 also includes a Secure Digital (SD) card slot 55 that accepts a SD card 57.

The mobile device of FIG. 10 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 11:
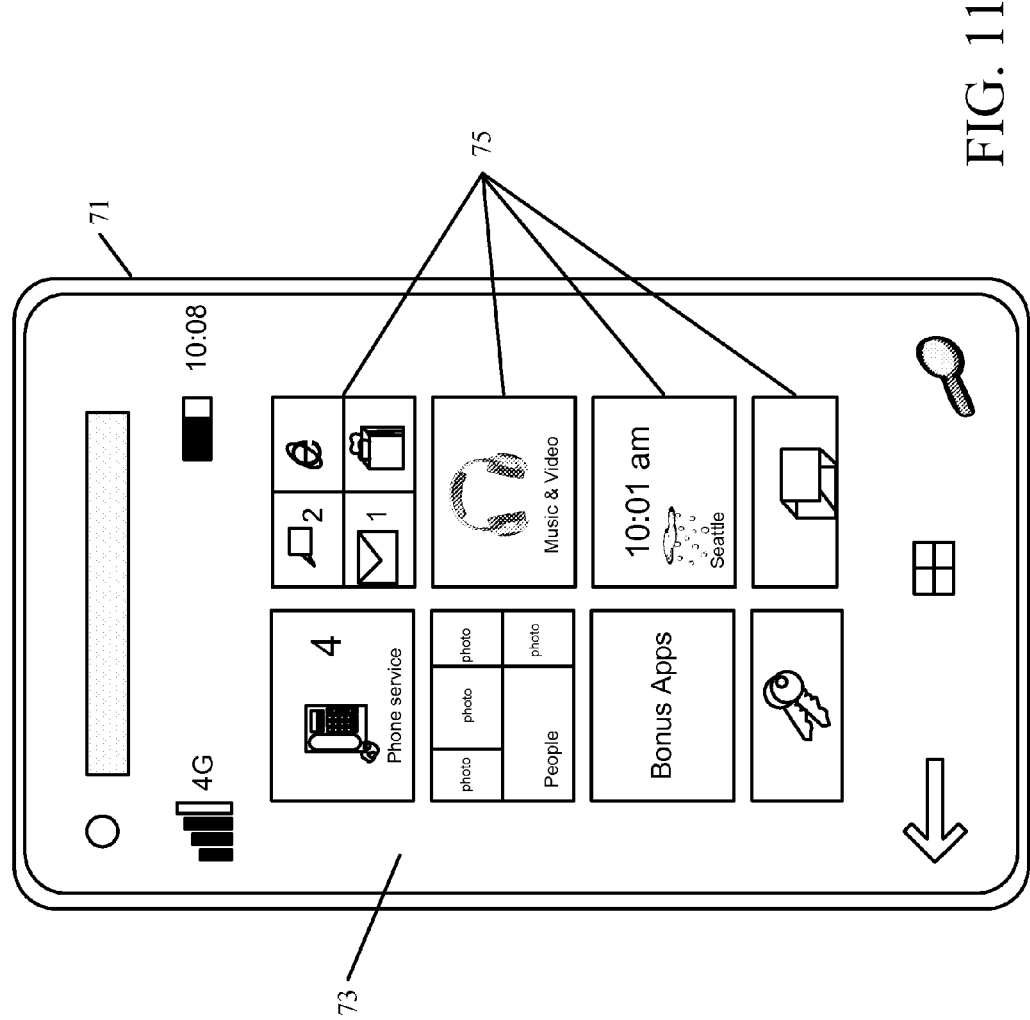

FIG. 11 is similar to FIG. 9 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
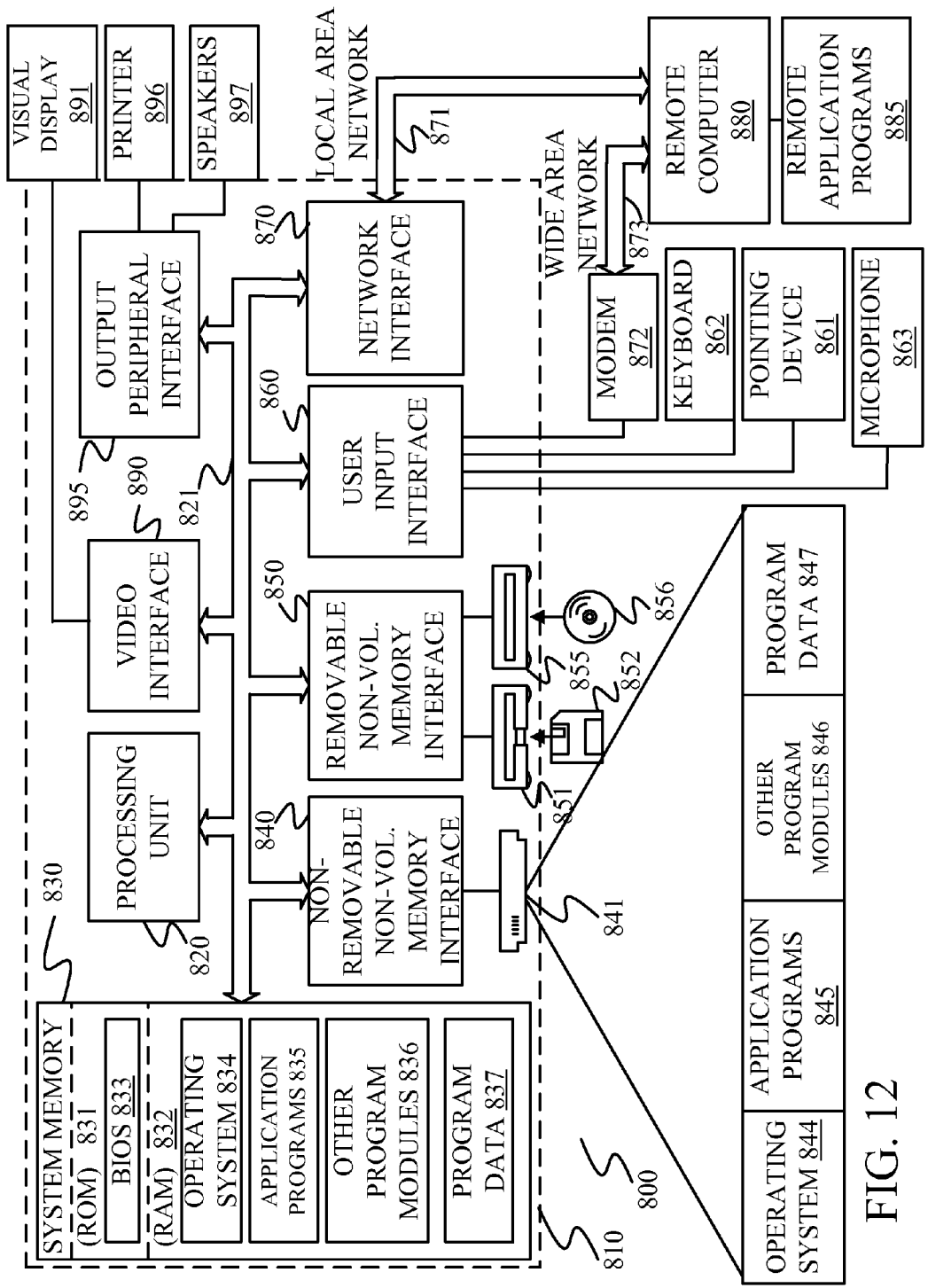
FIG. 12 is a block diagram of one illustrative computing environment.

FIG. 12 is one embodiment of a computing environment in which architecture 100, or parts of it, (for example) can be deployed. With reference to FIG. 12, an exemplary system for implementing some embodiments includes a general-purpose computing device in the form of a computer 810. Components of computer 810 may include, but are not limited to, a processing unit 820 (which can comprise processor 140, 303 or 326), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 12 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 12 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
receiving access strategy control inputs that direct discovery of only portions of a first implementation of a computer system that are complete in a second implementation that is a partial implementation;
selecting a form in the first implementation based on the access strategy control inputs;
identifying interactive user interface elements on the selected form;
identifying a state of each identified user interface element;
selecting an identified user interface element;
performing an interaction operation on the selected user interface element to identify a behavior of the first implementation;
automatically generating at least one test case based on the behavior of the first implementation;
determining a verification of the second implementation based on a detected reaction of the second implementation to execution of the at least one test case on the second implementation; and
providing an output based on the verification of the second implementation.

2. The computer-implemented method of clam 1 wherein identifying interactive user interface elements comprises:
identifying a predefined set of user interface elements on the selected form based on The access strategy control inputs.

3. The computer-implemented method of claim 1 wherein selecting an identified user interface element comprises:
selecting a given user interface element based on the identified behavior of the first implementation in response to interacting with a previously-selected user interface element.

4. The computer-implemented method of claim 1 wherein interacting with the selected user interface element comprises:
performing one of a predefined set of interaction operations on the selected user interface element based on the access strategy control inputs.

5. The computer-implemented method of claim 1 wherein identifying the behavior of the first implementation comprises:
identifying a reaction on the selected form in response to the interaction with the selected user interface element.

6. The computer-implemented method of claim 5 and further comprising;
selecting a corresponding form, in the second implementation, that corresponds to the selected form in the first implementation;
selecting a corresponding user interface element on the corresponding form, that corresponds to the selected user interface element;
performing the interaction operation on the corresponding user interface element; and
identifying a reaction on the corresponding form in the second implementation in response to performance of the interaction operation on the corresponding user interface element.

7. The computer-implemented method of claim 6 and further comprising;
determining whether the reaction on the corresponding form in the second implementation is the same or equivalent as the reaction on the selected form in response to the interaction with the selected user interface element; and generating a comparison indication indicative of whether the reactions are the same.

8. The computer-implemented method of claim 1 and further comprising: indexing the representation of the behavior of the first implementation for access by a search engine.

9. The computer-implemented method of claim 8 and further comprising:

ranking search results returned by the search engine based on the representation of the behavior.

10. The computer-implemented method of claim 1, wherein the access strategy control inputs specify which forms are to be discovered.

11. The computer-implemented method of claim 1, wherein the access strategy control inputs specify which user interface elements are to be discovered.

12. The computer-implemented method of claim 1, wherein the access strategy control inputs specify which interactions are to be discovered.

13. A discovery system, comprising:

a computer processor;

memory coupled to the processor and storing instructions that, when executed by the processor, cause the processor to provide a discovery control component, a behavior discovery component, and a verification system;

wherein the discovery control component receives strategy control inputs;

wherein the behavior discovery component is configured to;

select a form a first implementation of a computer system, identify interactive user interface elements on the selected form, identify a state of each identified user interface element, select an identified user interface element, and perform an interaction operation on the selected user interface element to only discover a behavior of the user interface elements of the first implementation that are complete in a second implementation that is a partial implementation based on the strategy control inputs; and wherein the verification system automatically generates test cases based on discovered behavior of the first implementation and performs interactions against the second implementation of the computer system using the test cases, compares the behavior of the first implementation against the behavior of the second implementation in response to the test cases and generates an output that is an indication of differences in behavior.

14. The discovery system of claim 13 and further comprising:

a behavior recording component that generates a representation of the behavior of the first implementation.

15. A re-implementation verification system comprising:

a computer processor;

memory coupled to the processor and storing instructions that, when executed by the processor, cause the processor to provide a behavior discovery component and a verification system;

wherein the behavior discovery component is configured to:

select a form in a first implementation of a computer system, identify interactive user interface elements on the selected form, identify state of each identified user interface element, select an identified user interface element, perform an interaction operation on the selected user interface element to only discover behavior of user interface elements of the first implementation of the computer system that are complete in a second implementation that is a partial implementation of the first implementation; and wherein the verification system is configured to perform interactions against the second implementation of the computer system, the verification system comparing system behavior of the first implementation against the behavior of the second implementation and generating an output that is an indication of differences of behavior.

16. The re-implementation verification system of claim 15, wherein one of the first and second implementations is an on-premises system and the other of the first and second implementations is a cloud-based implementation.

\* \* \* \* \*